Oct. 7, 1924.

A. G. SHAVER 1,510,803

SPEED CONTROLLER

Filed June 10, 1919    4 Sheets-Sheet 1

Fig.1

INVENTOR
A. G. Shaver
BY his
Meyers, Cavanagh & Whitehead
ATTORNEYS.

Oct. 7, 1924.  
A. G. SHAVER  
SPEED CONTROLLER  
Filed June 10, 1919  
1,510,803  
4 Sheets-Sheet 2

Inventor  
A. G. Shaver  
by David Petter Moore  
Attorney

Oct. 7, 1924.  1,510,803
A. G. SHAVER
SPEED CONTROLLER
Filed June 10, 1919   4 Sheets-Sheet 3

Inventor
A. G. Shaver
by Davis Pettor Moore
Attorney

Oct. 7, 1924.

A. G. SHAVER

SPEED CONTROLLER

Filed June 10, 1919     4 Sheets-Sheet 4

Inventor
A. G. Shaver
by Davis Pelton Moore
Attorney

Patented Oct. 7, 1924.

1,510,803

UNITED STATES PATENT OFFICE.

ARCHIBALD G. SHAVER, OF CHICAGO, ILLINOIS, ASSIGNOR, BY MESNE ASSIGNMENTS, TO REGAN SAFETY DEVICES COMPANY, INCORPORATED, A CORPORATION OF NEW YORK.

SPEED CONTROLLER.

Application filed June 10, 1919. Serial No. 303,191.

*To all whom it may concern:*

Be it known that I, ARCHIBALD G. SHAVER, a citizen of the United States, residing at Chicago, in the county of Cook and State of Illinois, have invented certain new and useful Improvements in Speed Controllers, of which the following is a specification, reference being had therein to the accompanying drawing.

This invention relates to a train control system, and more particularly to a train control system of the intermittent ramp type described and claimed in my copending application Serial No. 292,548 of April 25, 1919, and has special reference to the provision of a system of this type responsive to "safe", "caution" and "danger" track conditions; and relates co-ordinately to the provision of a novel speed circuit controller therefor.

The principal objects of the present invention include the provision of a system in which a roadside mechanism is operated to produce a normal, intermediate and abnormal indication responsive to track conditions, and in which vehicle carried mechanism is arranged to be influenced by the roadside mechanism to translate the indications on the latter for producing proceed, speed restrictive, and stop effects on the train.

A further principal object of the invention comprehends the provision of a speed controller preferably of the circuit controlling type attachable directly to the wheel of a vehicle so as to be rotatable therewith. A corelative object of the invention centers about the provision of a circuit controller of this nature which is directly attachable exteriorly to the axle or wheel of the pony truck of a locomotive designed so that the operated parts of the controller are directly actuated by movement of the vehicle and are protectively housed against damage and the elements.

To the accomplishment of the foregoing and such other objects as may hereinafter appear, my invention consists in the elements and their relation one to the other, as hereinafter particularly described and sought to be defined in the claims, reference being had to the accompanying drawings, which show a preferred embodiment of my invention and in which:—

Figure 1:
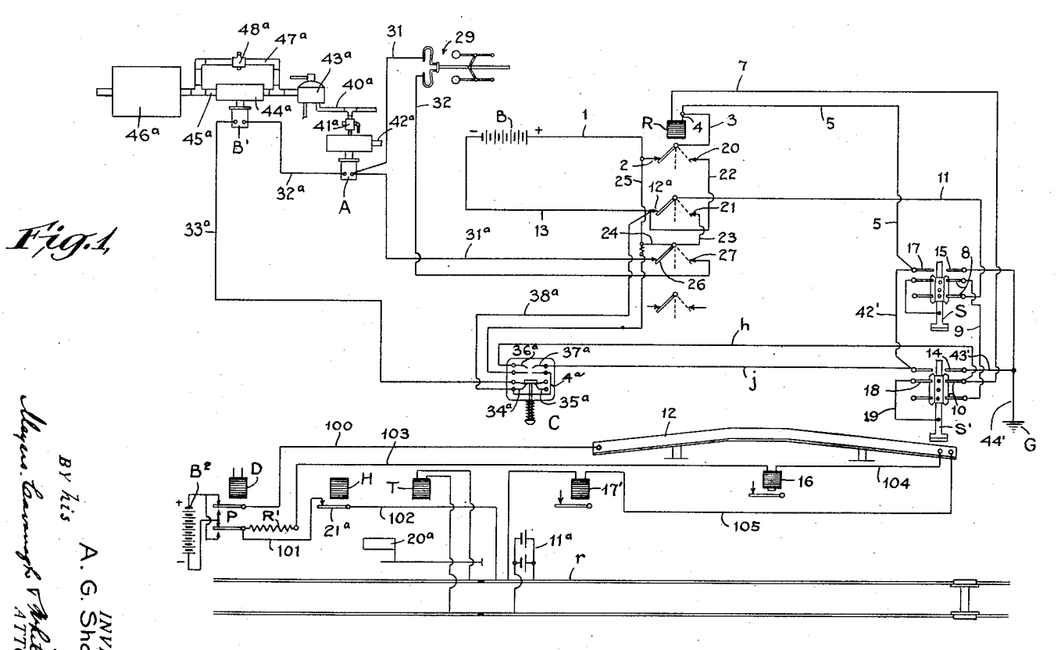
Figure 1 is a diagrammatic view showing a partial trackway circuit and the vehicle carried circuit with the present speed circuit controller shown in diagram thereon.

Referring to the drawings, and particularly to Fig. 1 thereof, $r$ designates the traffic rail, $11^a$ the track battery, and T the track relay, while $20^a$ designates the signal controlled thereby. As in the aforementioned copending application, the diagram illustrates the apparatus and circuits carried by the vehicle showing the complete equipment including the ramp located on the roadside and the circuit directly connected with the ramp, and it provides that when used with an existing automatic block signalling system with the roadside signal indicating "caution", the character of energy transmitted to the ramp and as picked up by the shoe on the vehicle causes the train to be slowed down, and then (if desired) to proceed under a fixed maximum speed. On the other hand, if the roadside signal indicates "stop", then no energy is transmitted through the ramp to the vehicle equipment and the result is to cause an application of the air brakes to bring the train to a stop. In the latter case the train after it is once stopped can only proceed as the result of the engine man manipulating a push key which will permit limited speed ahead to the next ramp, and if the next ramp is a normally charged ramp, the apparatus on the vehicle is restored automatically to a normal working condition with the train equipment operated to effect "proceed at unlimited speed" conditions.

In the circuit carried on the vehicle there is mounted in addition to the shoes S and S', a three position relay R, the same being of a type where with energy transmitted in one direction through the coils thereof, the armatures controlled thereby will stand in a predetermined position with one set of contacts being made or closed; while with the energy transmitted in an opposite direction the armatures stand in an opposite position with another set of contacts made or closed; and with a discontinuance of energy the armatures stand at neutral position without any contacts being made.

Thus with the apparatus on the vehicle in normal condition, the relay R is energized from the battery B, and the circuit for energizing the same includes the battery B, the conductor 1, the contact 2, the conductor 3, conductor 4, the relay R, the conductor 7, the contacts 10 of shoe S', the wire 9, the contacts 8 of shoe S, the conductor 11, the contact 12$^a$, and the conductor 13.

Assuming now that the shoe S' engages the ramp 12 and the roadside circuits are as indicated with the signal 20$^a$ in "clear" position, the shoe S' will be raised and the relay R will be energized from the positive side of the roadside battery B$^2$ through the pole changer contact P controlled by a distant relay D, the conductor 100, the ramp 12, the shoe S', the conductor 19, the contact 18, the conductors 42' and 5, the relay R, the conductor 7, the contact 14, the conductors 43' and 44', the ground G on the frame of the vehicle, through the wheels and track $r$, the conductor 102, the contact 21$^a$ of the home relay H, the conductor 101, and the pole changing contact P of the distant relay D.

While the apparatus on the vehicle is in normal condition, and also while the shoe is passing over an energized ramp, the circuit for the electromagnetic valves A and B' is closed as follows: through the battery B, conductors 1, 25 and 24, the contact 26, the conductor 31$^a$, the magnet A, the conductor 32$^a$, the magnet B', the conductor 33$^a$, the normally closed push button contact 34$^a$, and the conductors 38$^a$ and 13.

Assuming that the signal 20$^a$ is in the "caution" position, then the polarity of the current delivered to the ramp is reversed by the pole changing contacts P of the distant relay D, so that the negative side of the battery B$^2$ is connected to the ramp 12 through the conductor 100. When the shoe passes over the ramp the relay R then receives current in a direction opposite from the normal, with the result that the armatures are caused to assume the opposite position, which as indicated in dotted lines in Fig. 1 effects the closing of the contacts 20, 21 and 27, which contacts will remain closed until the vehicle reaches some ramp where the polarity of the battery B is either changed to normal or the battery disconnected.

With this reversal in polarity, the relay R on the vehicle after the shoe leaves the ramp is energized through the following cab circuit: the battery B, conductors 13 and 22, contact 20, conductor 3, relay R, conductor 7, contacts 10, conductor 9, contacts 8, conductor 11, contact 21 and the conductors 23, 24, 25 and 1.

Because of the change of polarity through the relay R, a different circuit is now established for the magnets A and B', this circuit including the battery B, conductors 1, 25 and 24, contact 27, conductor 32, speed controller contact 29, conductor 31, magnet A, conductor 32$^a$, the magnet B', conductor 33$^a$, normally closed contact 34$^a$ of the push key C, and the conductors 38$^a$ and 13.

Should the train under these conditions run at a greater speed than a certain maximum limited or permissive speed, the contact 29 will be opened, and therefore the valves A and B' will be deenergized. However, when the train slows down to its permissive speed, the contact 29 of the speed circuit controller will again close, so that the valves A and B' will be energized. The valve A is arranged to control the connection and disconnection between the train pipe 40$^a$ through the normally open cut off cock 41$^a$ to and from atmosphere through the vent 42$^a$, and the valve B' is arranged for connecting and disconnecting the engineer's brake valve 43$^a$ to and from the main reservoir 46$^a$ through the valve casing 44$^a$ and pipe line 45$^a$, a by-pass 47$^a$ controlled by a normally closed valve 48$^a$ being provided between the engineer's brake valve and the main reservoir. Under normal conditions with the electromagnets A and B' energized, the train pipe 40$^a$ is closed to atmosphere, and the engineer's brake valve 43$^a$ is connected for open communication with the main reservoir 46$^a$. When the electromagnets A and B' are deenergized, the reverse operation takes place, with the train pipe 40$^a$ vented for setting the brakes and with the engineer's brake valve 43$^a$ disconnected from the main reservoir 46$^a$. After the valves are deenergized under "caution" conditions and when the speed of the train is reduced, as soon as the brakes can be released the train can proceed under the maximum limited speed to the next ramp, at which if the condition is "clear", the relay R will shift to its normal position as shown in Fig. 1 so that the train may proceed at unlimited speed.

Assuming the condition where the block is occupied, such as would cause the signal 20$^a$ to be at "stop", then the contact 21$^a$ of the home relay H will be opened, breaking the connections with the track battery B$^2$. In this condition when the shoe is lifted the contacts 18 and 14 will be made and the lower contact 10 will be broken. The breaking of the lower contact 10 disconnects the cab battery B from the relay R, and hence as the roadside battery B² is disconnected no energy is transmitted to the ramp and the shoe so that the relay R is deenergized. The result is that the armatures controlled thereby assume neutral positions without either contacts 27 or 26 being made, so that the magnet valves A and B' are deenergized, causing the train to be brought to a stop and causing the air to be cut off from the main reservoir to the engineer's brake valve.

After the train is brought to a halt, it is necessary for the engineer to operate the push key C, and operation of the same places the vehicle in "proceed under limited speed conditions". The circuit which is completed to energize the relay R when the push key C is lifted includes the battery B, conductors 1 and 25, contact 36ª, conductor $h$, upper contact 10 of shoe S, conductor 7, relay R, conductors 5, 42' and $j$, contacts 37ª, and conductors 4ª 38ª and 13. It will be noted that in operating the push key C the position in which the relay is restored opens contact for the control of the valve magnets A and B', and with this construction the key cannot be held permanently in an elevated position, but must be operated each time from the ground after the train has been stopped.

For the purpose of detecting the integrity of the ramp 12 and the ramp circuits, there is provided in the ramp circuit which includes the rail $r$, a relay 17' which when deenergized, as by the breaking of the ramp or the ramp circuit, will effect the release of an armature controlled thereby, this producing a "danger" indication in a signalling system as described in detail in my copending application above referred to. For the purpose of detecting the integrity of the ramp at all times, there is also provided an additional safety or detecting circuit which includes the ramp 12, the conductor 104, the relay 16, the conductor 103, the resistance R', the pole changer P, the battery B², and conductor 100. The relay 16 may be of comparatively high resistance, and the resistance R' is installed in the circuit for reducing the normal battery consumption for energizing this relay. Upon the breaking of a ramp, this relay 16 will be deenergized for opening the contact controlled thereby, the opening of such contact being intended for producing a warning signalling indication as described in detail in my copending application above referred to.

With such an arrangement as indicated in Fig. 1, it is impossible for the engineer to take control of the train when "stop" indication is given because by action of the reservoir valve the supply of air in the main reservoir is cut off from the engineer's brake valve.

Figure 7:
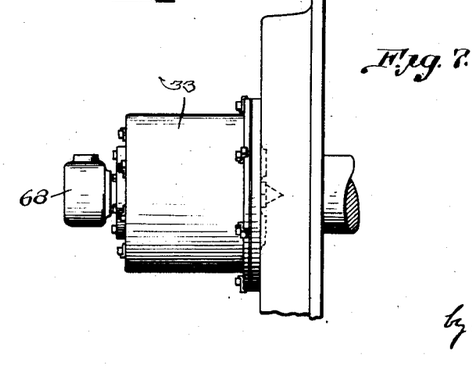
Fig. 7 is a view showing the manner in which the speed controller is attached to a wheel of the vehicle.

The detail construction of the speed controller is clearly shown in Figures 2, 3, 4 and 5, in which the main member consists of the casing 33, the inner attaching head 34 and the outer attaching head 35, the head 35 being insertible within the casing 33 and attached to the flange 36 by bolts 37 while the head 34 is attached by bolts 38 to the flange 39. The two studs or bolts 40 connect the two heads 34 and 35 together so that the bushings 41 thereon properly hold these members spaced, which is essential in a device of this character, as the complete body rotates in this form with the centering cone 42 disposed within the centering recess of the hub or axle of an engine truck wheel, the head 34 being bolted to the wheel so as to bodily rotate therewith as clearly shown in Fig. 7 of the drawings. Projecting centrally from the inner face of the head 34 is a pin or stud 43 having the threaded portion 44 for the reception of the adjusting and locking nuts 45 while mounted upon the reduced end of the stud for limited sliding movement, is the sleeve 46 which is normally held outwardly by means of the spring 47 whose tension is adjustable by the nuts 45. Carried in the outer end of the sleeve 46 and insulated therefrom by means of the block of insulation 48, is an adjusting contact stud 49, the purpose of which will presently appear.

Figure 2:
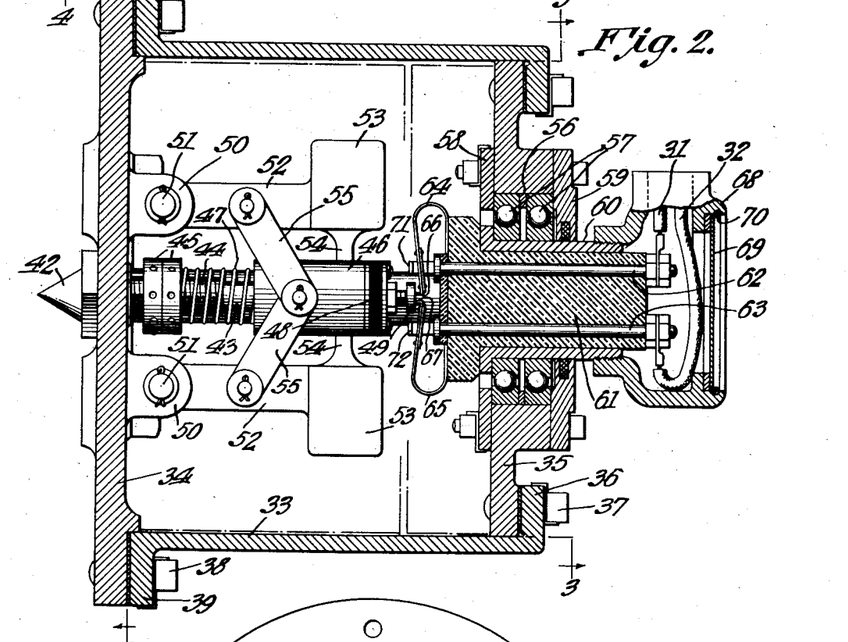
Figure 2 is a longitudinal sectional view through the complete speed circuit controller.
Figure 3:
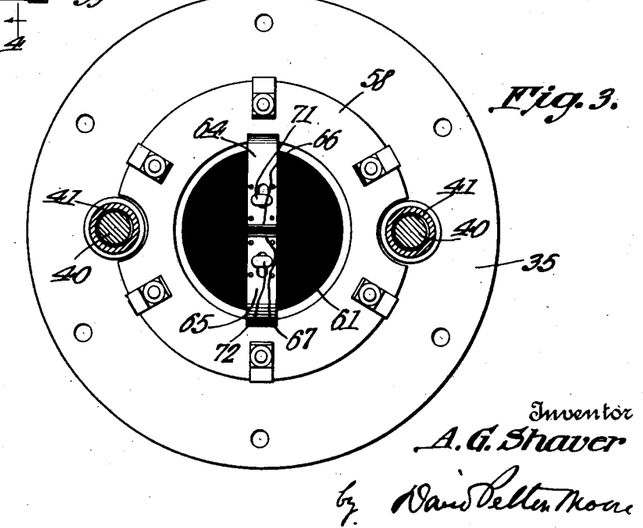
Figure 3 is a section taken on line 3—3 of Figure 2.
Figure 4:
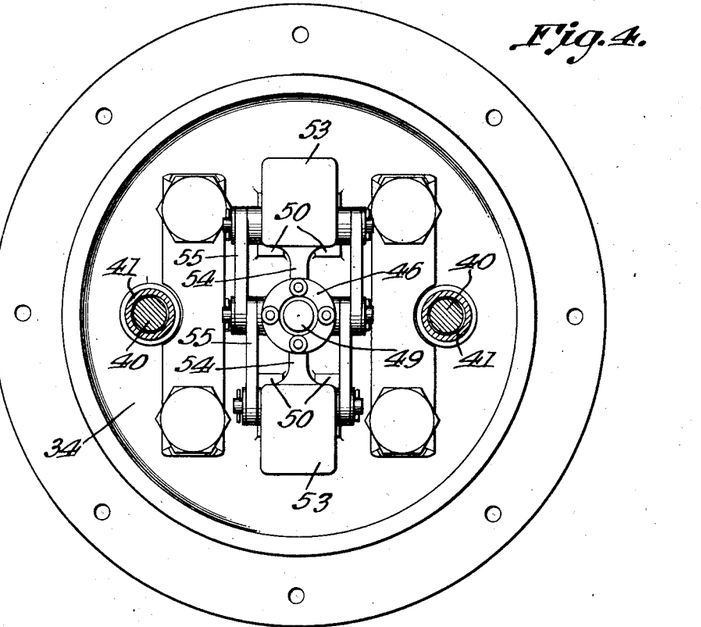
Figure 4 is a section taken on line 4—4 of Figure 2.
Figure 5:
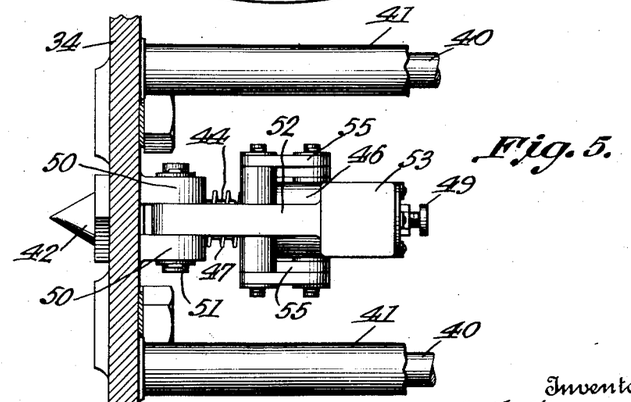
Figure 5 is a detail view of the governor mechanism shown at right angles to that shown in Figure 2.

Upon the inner face of the head 34 are carried the two pairs of apertured lugs 50 for the reception of the journalling shafts 51 for the weighted arms 52, the weights 53 thereof being each provided with a limiting lug 54 adapted to abut the opposite sides of the sleeve 46 when the sleeve is projected to its fullest extent. In order to connect the weighted arms to the sleeve 46 so that the sleeve is moved longitudinally in opposition to the spring 47 due to the centrifugal force moving the weights 53, the two pairs of links 55 are pivotally attached to opposite sides of the sleeve 46 and to the weighted arms 52.

It will thus be seen that by the rotation of the casing the weights 53 will be caused to move outwardly and thus act upon the sleeve 46 to move the contact or bridging member 49 in opposition to the spring 47.

Mounted in an opening 56 of the head 35 are the antifrictional bearing members 57, being held in position by means of the locking plates 58 and 59 and forming an antifrictional support for a sleeve or bushing 60 which carries the insulation member 61 the bushing and insulating members being adapted by this construction to remain in a stationary position during the rotation of the casing 33 and the parts carried thereby. Carried by the member 61 are the two terminals 62 and 63 which extend from one end to the other of the member 61 and connected to their inner ends are the respective spring contact plates 64 and 65, whose terminals 66 and 67 are adapted to normally rest against the rotating bridging member 49, thus closing the circuit, as above referred to, through the conductors 31 and 32, which are connected to the opposite end of the terminals 62 and 63 within the housing or cap 68 which is attached to the sleeve 60 and is constructed to receive an electrical conduit, not shown. This cap 68 is provided with the removable disk 69, held in place by the expansion ring 70 so that the outer ends of the terminals 62 and 63 may be readily accessible.

It will thus be seen that the casing which is directly attached to the wheel of the vehicle so as to be rotatable therewith consists essentially of two sections, the first section of which is attached to for bodily rotation with the wheel, and the second section of which is carried by for rotation relatively to the first section; and in the preferred construction the second section being intended to be held stationary during the rotation of the wheel, is supported by means of anti-frictional bearings on the first section. In the preferred construction also as shown in the drawings, the casing sections form a complete enclosure for protectively housing the operated parts of the controller. It has been found after a long period of use in automatic train control service that the simplicity of construction of this speed controller and its direct mounting on the wheel of the pony truck of the vehicle results in reliability and dependability of operation.

The bushing 60 and the member 61 are thus held stationary through the medium of the conduit mounting, while the remaining member of the mechanism is adapted to rotate, the spring 47 being so adjusted as to permit the forward movement of the weighted arms 52 when the same is rotated beyond a certain speed so that the bridging member 49 is moved to the left, as shown in Figure 2, and to a point so as to dis-engage the contacts 66 and 67 when the members 64 and 65 have engaged the limiting members 71 and 72 this permitting considerable latitude in the movement of the sleeve 46 when the circuit is open at this point.

Figure 6:
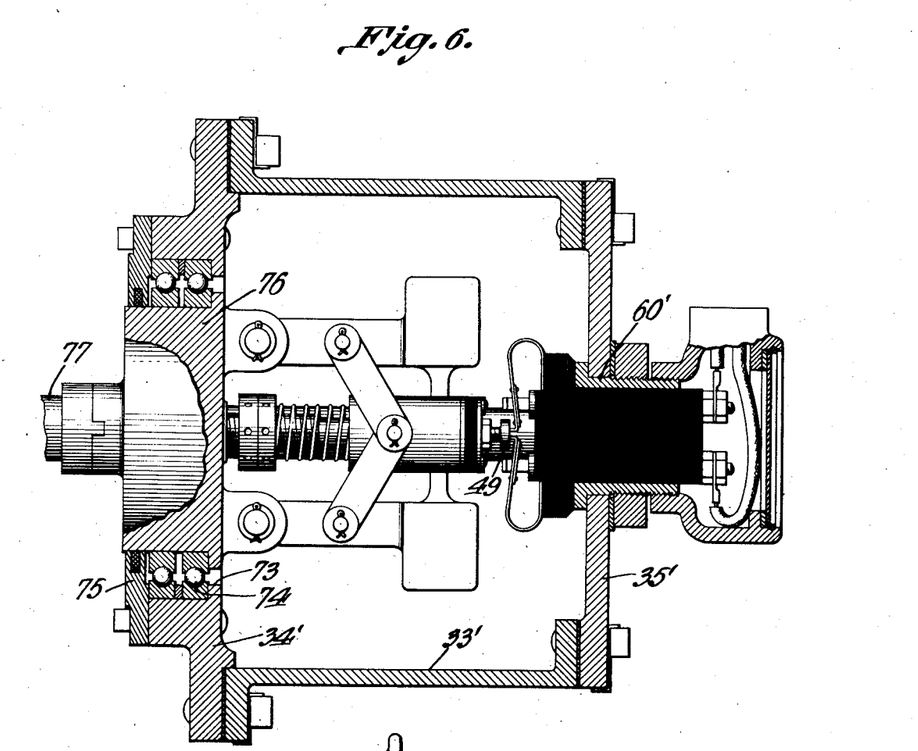
Figure 6 is a view similar to Figure 2, showing the construction modified to be driven by a flexible or other shaft.

In the construction shown in Figure 6 the parts are practically reversed, the casing 33' having the head 35' attached thereto so as to carry the fixed bushing 60'. The head 34' is modified so as to be provided with an opening 73 in which are mounted the anti-frictional bearings 74, being locked in place by means of the ring 75 so as to properly support the circular supporting disk 76 to which is adapted to be connected a flexible or other driving shaft 77, so that the disk 76 is rotated and in turn rotates the governor mechanism, the construction of which is identical as that shown in Figure 2.

In this instance it will be noted that instead of the entire casing rotating as that shown in Figure 2, the disk 76 only rotates to affect the governor arms and the bridging contact 49.

While I have shown and described my device in the preferred form, it will be obvious that many changes and modifications may be made in the structure disclosed without departing from the spirit of the invention, defined in the following claims.

What I claim as new is:

1. The combination with the outer end of a wheel, of a speed circuit controller for train control systems including a casing adapted to be attached to for bodily rotation with said wheel, with the axis thereof aligned with the axis of the wheel, a rotative member fixedly carried by and rotatable with the casing including a governor controlled contact member and a relatively fixed suspended contact member cooperable therewith and mounted in the outer end of said casing.

2. A speed circuit controller including a casing for direct attachment to the outer end of a revolving wheel to be bodily rotatable therewith, a governor mechanism mounted within and rotatable with the casing, an electrical contact controlled by the governor mechanism, and a relatively fixed electrical contact in cooperative relation therewith and around which the casing rotates.

3. A speed circuit controller including a bodily rotatable casing, said casing being adapted to be attached to the outer end of a wheel for bodily rotation therewith with its axis aligned with the axis of the wheel, a fixed member carried in the outer end of the casing, a governor controlled mechanism mounted for rotation with and disposed within the casing, and a switch composed of a plurality of members certain of which are carried by the governor controlled mechanism and certain of which are carried by the fixed member.

4. A speed circuit controller including a bodily rotatable casing, centrifugally operated means carried thereby and rotatable therewith, a circuit closing member carried by the said means, a fixed insulating member, and contacts carried thereby and insulated from each other and having terminals adapted to engage the circuit closing member.

5. A speed circuit controller comprising a casing, two heads connected to the casing, one of said heads being provided with anti-frictional bearings, a governor controlled circuit member mounted within the casing for rotation, and a fixed circuit carried member supported on the anti-frictional bearings and adapted to engage the governor controlled circuit member.

6. A speed circuit controller including a casing, two heads for the casing, one of which is provided with an opening, an anti-frictional bearing mounted in said opening, a fixed sleeve mounted in the antifrictional bearing whereby the casing may be rotated, one portion of a circuit closing member carried upon the inner end thereof and disposed within the casing, a pair of pivoted governor arms mounted within and bodily rotatable with the casing, a slidable sleeve connected to the governor arms, an adjustable spring for holding the sleeve extended and the governor arms collapsed, and another portion of the circuit closer carried upon the outer end of the sleeve.

7. A speed controller including a casing, two heads attached to the opposite ends of the casing, a concentrically disposed stud mounted in one of the heads and provided with a cylindrical and threaded portion, a sliding sleeve mounted within the cylindrical portion within the casing, a spring mounted upon the stud for normally holding the sleeve extended, adjustable means mounted upon the threaded portion of the stud for adjusting and locking the spring, a pair of governor arms pivotally connected to one head of the casing and operably connected to the sliding sleeve for moving the sleeve in opposition to the spring, a fixed member mounted in the opposite head of the casing, and cooperative circuit controlling means carried upon the inner face thereof and the outer face of the sliding sleeve.

8. A speed controller including a casing, two heads attached to the opposite ends of the casing, a concentrically disposed stud mounted in one of the heads and provided with a cylindrical and threaded portion, a sliding sleeve mounted within the cylindrical portion within the casing, a spring mounted upon the stud for normally holding the sleeve extended, adjustable means mounted upon the threaded portion of the stud for adjusting and locking the spring, a pair of governor arms pivotally connected to one head of the casing and operably connected to the sliding sleeve for moving the sleeve in opposition to the spring, the remaining head being provided with a concentric opening, an antifrictional bearing mounted therein, a fixed sleeve mounted upon the antifrictional bearing, about which the casing rotates, and cooperative circuit controlling means carried upon the inner face of the same and the outer face of the sliding sleeve.

9. In a vehicle or train mechanism, the combination with a wheel of the vehicle, of a speed controller attached to said wheel and carried thereby and circuit controlling contact mechanism influenced by the operation of said controller.

10. In a vehicle control system, the combination with a wheel of the vehicle, of a speed controller attached to said wheel and carried thereby for rotation therewith, and contact mechanism including a relatively stationary contact member influenced by rotation of the controller.

11. In a vehicle or train mechanism, the combination with a wheel of the vehicle, of a centrifugal governor attached to said wheel and carried thereby for rotation therewith and circuit controlling contact mechanism influenced by rotation of said governor.

12. Vehicle or train mechanism comprising a speed controller including means for attaching the same to a wheel of the vehicle to be carried thereby and circuit controlling mechanism operated by the speed controller.

13. Vehicle or train mechanism comprising a centrifugal governor including means for attaching the same to a wheel of the vehicle to be carried thereby for rotation therewith and circuit controlling contact mechanism operated by the centrifugal governor.

14. The combination with a wheel of a vehicle, of a vehicle speed controller comprising a support adapted to be attached to for bodily rotation with said wheel, a rotative member carried by and rotatable with the support including a speed controlled contact member, and a relatively stationary contact member cooperable therewith.

15. The combination with the truck of a vehicle, of a speed controller including means for attaching the same to the truck with the axis of the controller aligned with an axle of the truck, a rotative member carried by and rotatable with the said means including a speed control contact member, and a relatively stationary contact member cooperable therewith.

16. The combination with a wheel of a vehicle, of a vehicle speed controller comprising a support having means for attachment to the outer end of the wheel with the axis thereof aligned with the axis of the wheel, a rotative member carried by and rotatable with the support including a speed controlled contact member, and a relatively stationary contact member cooperable therewith.

17. A speed circuit controller including a support for direct attachment to a revolving wheel to be bodily rotatable therewith, a governor mechanism carried by said support, an electrical contact member controlled by the governor mechanism, and a relatively fixed electrical contact member mounted in cooperative relation therewith.

18. A speed circuit controller including a bodily rotatable support having means for attachment to the wheel of a vehicle, centrifugally operated means carried thereby and rotatable therewith, a circuit closing member carried by said means, a relatively fixed insulating member, and contact elements carried thereby for cooperation with the circuit closing member.

19. In combination with the wheel of a vehicle, a speed circuit controller comprising a two-part casing, one part being attached to the wheel and rotatable therewith and relatively to the other part, a governor controlled circuit member mounted on one casing part, and a cooperating circuit carrying member mounted on the other casing part.

20. In a vehicle or train mechanism, a speed controller comprising a support for attaching the controller to the truck of the vehicle with the axis of the controller aligned with an axle of the vehicle, a rotative member carried by said support including a speed controlled contact member, and a relatively stationary contact member cooperable therewith.

21. In a vehicle or train mechanism, a speed controller comprising a support adapted to be attached to for bodily rotation with a wheel of the vehicle, a rotative member connected to the support including a speed controlled contact member, and a relatively stationary contact member cooperable therewith.

22. The combination with a wheel of a vehicle, of a vehicle speed controller attached to for rotation with the said wheel, a contact member carried by the speed controller, and a relatively stationary contact member cooperating therewith.

23. The combination with the pony truck of a vehicle, of a speed controller attached exteriorly to the truck with the axis of the controller aligned with the axle of the truck, a contact member carried by the speed controller, and a relatively stationary contact member cooperating therewith.

24. In a vehicle or train mechanism, the combination with a wheel of the vehicle, of a speed controller attached to and carried by said wheel and contact mechanism operated thereby, the speed controller influencing the contact mechanism so as to open the same above and close the same below a predetermined speed of the vehicle.

25. In a vehicle or train mechanism, the combination with a wheel of the vehicle, of a speed controller attached to said wheel and carried thereby, and circuit controlling contacts influenced by the operation of said controller to be opened at a certain predetermined speed.

26. In a vehicle or train mechanism, the combination with a wheel of the vehicle, of a speed controller attached to and carried by said wheel, contact mechanism operated thereby, the speed controller influencing the contact mechanism to open the same above and close the same below a predetermined speed of the vehicle, and adjusting means for predetermining the point of opening and closing of said contact mechanism.

27. In a vehicle or train mechanism, the combination with a wheel of the vehicle, of a speed controller attached to said wheel and carried thereby, circuit controlling contacts influenced by the operation of said controller to be opened at a certain predetermined speed, and adjusting means for predetermining the point of opening of said contact means.

28. In a vehicle control mechanism, in combination with a wheel of the vehicle, of a speed controller comprising a first section attached to for bodily rotation with the wheel, a second section axially aligned with the first section, and bearing means supporting the said second section on said first section, the second section being adapted to be held stationary during the rotation of said wheel and said first section.

29. In a vehicle control mechanism, in combination with a wheel of the vehicle, of a speed controller comprising a first section attached to for bodily rotation with the wheel, a second section axially aligned with the first section, anti-frictional bearing means supporting the said second section on said first section, and means operable by the rotation of said wheel and said first section relatively to the said second section for controlling the movement of the vehicle.

30. In a vehicle control mechanism, in combination with a wheel of the vehicle, of a speed controller comprising a first section attached to for bodily rotation with the wheel, a second section adapted to be held stationary during the rotation of the wheel, and bearing means supporting the said second section on the first section.

31. In a vehicle control mechanism, in combination with the truck of the vehicle, of a speed controller comprising a first section attached exteriorly to the truck with the axis of the same aligned with the axle of the truck, a second section axially aligned with the first section, and anti-frictional bearing means supporting the said second section on said first section, the second section being adapted to be held stationary during the rotation of said wheel and said first section.

32. In a vehicle control mechanism, in combination with the truck of the vehicle, of a speed controller comprising a first section attached exteriorly to the truck with the axis of the same aligned with the axle of the truck, a second section axially aligned with the first section, anti-frictional bearing means supporting the said second section on said first section, and means operable by the rotation of said axle and said first section relatively to the said second section for controlling the movement of the vehicle.

33. In a vehicle control mechanism, in combination with the truck of the vehicle, of a speed controller comprising a first section attached exteriorly to the truck with the axis of the same aligned with the axle of the truck, a second section adapted to be held stationary during the rotation of the wheel, anti-frictional bearing means supporting the said second section on the first section, and means operable by the rotation of said axle and said first section for controlling the movement of the vehicle, both of said sections forming an enclosure for said means.

34. In a vehicle control mechanism, in combination with the wheel of the vehicle, of a speed controller comprising a multiple-part casing, one part being attached to the wheel and rotatable therewith and relatively to another part, and means carried by and housed within said casing parts operated by the relative rotation thereof for controlling the movement of the vehicle.

35. In a vehicle control mechanism, in combination with the wheel of the vehicle, of a speed controller comprising a multiple-part casing, one part being attached to the wheel and arranged with its axis aligned with the axis of the wheel and another part being rotatively carried by and aligned with the said one part, the said other part being adapted to be held stationary relatively to the said one part during the rotation of the wheel, and means carried by and housed within said casing parts operated by the relative rotation of such casing parts for controlling the movement of the vehicle.

36. In a vehicle control mechanism, in combination with the wheel of the vehicle, of a speed controller comprising a multiple-part casing, one part being attached to the wheel and rotatable therewith and another part being carried by the first part and rotatable relatively thereto, and means carried by and housed within said casing parts operated by the relative rotation thereof for controlling the movement of the vehicle.

37. In a vehicle control mechanism, in combination with the truck of the vehicle, of a speed controller comprising a two-part casing, one part being attached exteriorly to the truck and arranged with its axis aligned with the axis of the truck and the other part being rotatively carried and aligned with the said one part, the said other part being adapted to be held stationary relatively to the said one part during the rotation of the wheel, and means carried by and housed within said casing parts operated by the relative rotation of such casing parts for controlling the movement of the vehicle.

38. In a vehicle control system, in combination with a wheel of the vehicle, of a speed controller attached to and supported on said wheel and having a part rotated thereby, and contact mechanism including a relatively stationary contact member influenced by the operation of the controller.

39. In a vehicle or train mechanism, the combination with a wheel of the vehicle, of a speed controller connected to and carried by said wheel and having a part rotating therewith and circuit controlling contact mechanism influenced by the operation of said controller.

40. The combination with the truck of a vehicle, of a vehicle or train mechanism comprising a speed controller attached exteriorly to the truck of the vehicle with the axis of the controller aligned with an axle of the truck, the said controller having a part rotatable with the axle, and circuit controlling contact mechanism influenced by the operation of said controller.

41. In a vehicle or train mechanism, the combination with a wheel and axle of the vehicle, of a speed controller connected to said wheel and axle and carried thereby, and circuit controlling mechanism operated by the speed controller.

42. In a vehicle or train mechanism, the combination with a wheel and axle of the vehicle, of a speed controller connected to the wheel and axle and carried thereby and having a part rotating therewith, and circuit controlling mechanism operated by the speed controller.

In testimony whereof I affix my signature.

ARCHIBALD G. SHAVER.